United States Patent [19]

Mizuhara

[11] Patent Number: 5,069,978
[45] Date of Patent: Dec. 3, 1991

[54] BRAZED COMPOSITE HAVING INTERLAYER OF EXPANDED METAL

[75] Inventor: Howard Mizuhara, Hillsborough, Calif.

[73] Assignee: GTE Products Corporation, Stamford, Conn.

[21] Appl. No.: 594,494

[22] Filed: Oct. 4, 1990

[51] Int. Cl.⁵ ..................... B32B 3/24; B23K 103/18
[52] U.S. Cl. .................................. 428/594; 428/621; 428/627; 428/632; 228/122; 228/188; 228/189
[58] Field of Search ............... 428/596, 615, 608, 621, 428/614, 622, 609, 627, 632, 633, 629, 594; 228/121, 122, 123, 56.3, 246, 188, 189

[56] References Cited

U.S. PATENT DOCUMENTS

| | | |
|---|---|---|
| 2,694,852 | 11/1954 | Rogers ................... 228/189 |
| 2,775,030 | 12/1956 | Weiss .................... 428/594 |
| 3,002,834 | 10/1961 | Pasquale ................. 428/614 |
| 3,153,581 | 10/1964 | Hutchins ................. 428/620 |
| 3,214,564 | 10/1965 | Katzer et al. ............ 428/608 |
| 3,345,734 | 10/1967 | Sowko ................... 428/608 |
| 3,399,332 | 8/1968 | Savolainen ............... 428/614 |
| 3,480,842 | 11/1969 | Scharli .................. 357/71 |
| 3,764,277 | 10/1973 | Hollis ................... 428/594 |
| 3,884,646 | 5/1975 | Kenney ................... 428/594 |
| 4,211,354 | 7/1980 | Hoffman et al. ........... 228/118 |
| 4,393,122 | 7/1983 | Takayasu ................. 428/594 |
| 4,482,912 | 11/1984 | Chiba et al. ............. 428/608 |
| 4,529,836 | 7/1985 | Powers et al. ............ 228/123 |
| 4,759,994 | 7/1988 | Lesourd .................. 428/594 |
| 4,865,896 | 9/1987 | Yoshida et al. ........... 428/632 |
| 4,875,616 | 10/1989 | Nixdorf .................. 228/122 |

FOREIGN PATENT DOCUMENTS 3608101 9/1987 Fed. Rep. of Germany ..... 228/56.3
2017408A 10/1979 United Kingdom ............... 428/620

OTHER PUBLICATIONS

Abstract for Japanese Kokkai 51-2653 (10.01.76).

Primary Examiner—John J. Zimmerman
Attorney, Agent, or Firm—J. Theodosopoulos

[57] ABSTRACT

Two materials having different coefficients of thermal expansion are brazed together by use of an interlayer of expanded metal therebetween. The expanded metal makes point-type contact with the two materials and accommodates stresses resulting from the expansion difference.

12 Claims, 1 Drawing Sheet

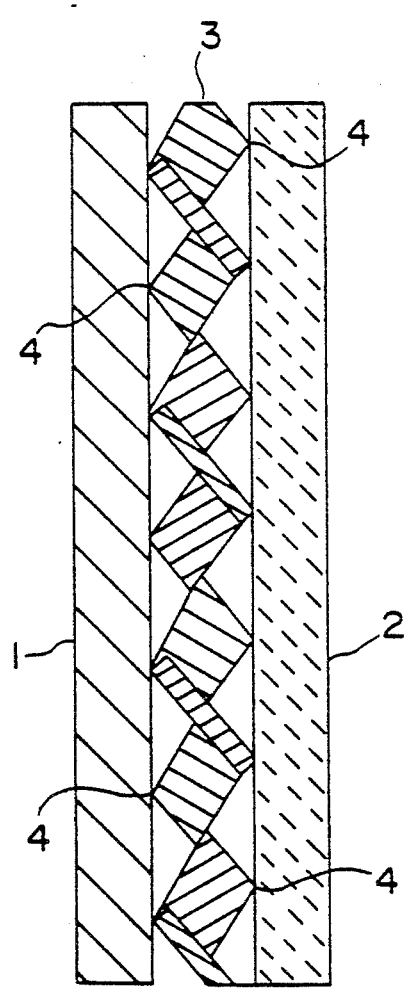

BRAZED COMPOSITE HAVING INTERLAYER OF EXPANDED METAL

BACKGROUND OF THE INVENTION

This invention concerns the brazing together of two materials, for example, a ceramic and a metal, having different coefficients of thermal expansion. U.S. Pat. No. 4,690,876 discloses the use of a ductile brazing alloy foil for that purpose. However, such a ductile brazing alloy foil is generally satisfactory only for relatively small parts, say, less than about one inch in cross section at the jointure area. Column 1, lines 5-16 of U.S. Pat. No. 4,598,025 discloses the use of a molybdenum copper composite interlayer between two such parts to be brazed. U.S. Pat. No. 4,562,121 discloses the use of a cushion layer, for example, copper, between two solder layers between the two parts to be joined.

SUMMARY OF THE INVENTION

This invention concerns an improved method of joining materials having different coefficients of thermal expansion. The invention uses an expanded metal interlayer between the materials to be joined. Expanded metal is made by the simultaneous slitting and stretching of metal foil, which forms openings in the metal foil and increases the overall thickness of the expanded metal above that of the original metal foil. The slits are made across the width of the metal foil and, in a line of slits across the width, there are a number of spaced apart slits. The lines of slits are parallel to each other and the slits in each line are offset from the slits in the adjacent parallel lines so that, upon stretching in the longitudinal direction of the metal foil, the slits form openings in the expanded metal. The distance between two adjacent parallel lines of slits is called the strand width. A common form of opening in expanded metal is a diamond shape. The advantage of expanded metal is that when a layer thereof is placed on a flat surface, the expanded metal makes only point contacts with the flat surface. In the case of the diamond shape opening, the only contacts between the expanded metal and the flat surface are at the four corners of each diamond. When an expanded metal layer is brazed between two thermally mismatched materials and when brazing fillets occur only on the above mentioned contact points, the expanded metal layer is free to distort considerably in order to accommodate stresses resulting from the thermal mismatch. Expanded metal is made by, for example, Exmet Corporation of Bridgeport, Conn., Wallner Tooling, Inc of Rancho Cucamonga, Calif. and Delker Corporation of Branford, Conn.

The brazing of the expanded metal interlayer between the thermally mismatched materials can be accomplished by the use of brazing materials known in the art. For example, when one of the materials to be joined is a ceramic member, an active brazing alloy, such as disclosed in U.S. Pat. No. 4,623,513 or an active copper-silver-titanium alloy, such as disclosed in U.S Pat. No. 4,684,579, can be used for the direct joining of the ceramic. Or the ceramic can be coated with moly-manganese and then brazed without the need of an active alloy. Or the ceramic can be sputter coated with an active element, such as titanium, followed by use of a standard alloy foil, such as silver-copper eutectic, followed by vacuum brazing. When ceramic is one of the materials to be braced, the ceramic surface should be defect-free. This can be accomplished by the method as shown in U.S. Pat. No. 4,591,535.

BRIEF DESCRIPTION OF THE DRAWING

The drawing is a sectional view of an expanded metal interlayer brazed between a steel plate and an alumina substrate.

DESCRIPTION OF THE PREFERRED EMBODIMENTS

In the examples that follow the expanded metal used was made of 5 mil nickel foil and had a strand width of 45 mils. The overall thickness of the expanded metal layer was 56 mils.

EXAMPLE 1

In order to minimize excessive running of the brazing alloy upon melting thereof, the nickel expanded metal was preoxidized at 1000° F. in air for two hours. As shown in the drawing, steel plate (1), 2"×2"×0.1" thick, was bonded to an alumina substrate (2), 2"×2"×0.125" thick, with the expanded metal layer (3), 2"×2"×0.056" thick, therebetween. A brazing alloy filler metal of silver-copper-indium-titanium in paste form was screened on to the alumina substrate using 105 mesh screen. A 2"×2"×0.002" thick foil, also of the silver-copper-indium-titanium brazing alloy filler metal, was placed on the steel plate, between the steel plate and the expanded metal interlayer. With the steel on the bottom and an 800 gram weight on top of the alumina, the assembly was brazed at 700° C. for ten minutes under $10^{-5}$ torr vacuum. Each expanded metal contact point (4) had a smooth fillet resulting in an excellent brazed assembly. The oxidized nickel prevented the alloy from flowing, thereby confining the filler metal to the substrate faces.

EXAMPLE 2

A silicon nitride plate, 1¼"×1¼"×0.1" thick, was brazed to a steel plate, 1¼"×1¼"×0.1" thick, with a 1¼"×1¼" expanded metal interlayer therebetween. Both plates were coated with a screening paste containing brazing alloy filler metal of silver-copper-tin-titanium, were dried and then assembled with the expanded metal interlayer in between. The assembly was brazed at 810° C. under $10^{-5}$ torr vacuum. An excellent bond resulted.

EXAMPLE 3

In this example, an aluminum nitride plate was bonded to a stainless steel plate, each plate measuring 1"×1"×0.050" thick. Incusil ABA screening pate was applied to each plate. Incusil ABA is a brazing alloy of silver-copper-indium-titanium made by Wesgo division, GTE Products Corporation. A 1"×1" expanded metal layer was placed between the plates and the assembly was held down by a 100 gram load during brazing. The assembly was brazed at 700° C. under $10^{-5}$ torr vacuum. An excellent brazed assembly was obtained.

EXAMPLE 4

In this example, an alumina plate, 1¼"×1¼"×0.1", was brazed to a stainless steel plate, 1¼"×1¼"×0.050". The stainless steel plate was coated with Copper ABA screening paste. Copper ABA is a brazing alloy containing copper and an active metal; it is made by Wesgo. Two mil Copper ABA foil was placed between the alumina plate and the expanded metal layer. The assembly was brazed at 1025° C. under 10$^{-5}$ torr vacuum and resulted in a good fully filleted joint.

EXAMPLE 5

A solid metal rod was machined to make a two inch long hollow shaft on one end. The rod was made of an alloy of iron, nickel, cobalt, niobium and titanium. A silicon nitride rod was brazed to the metal rod using an expanded metal interlayer, as follows. The inside of the hollow shaft was braze coated using Incusil ABA paste. The silicon nitride rod was also braze coated using Incusil ABA pate. A layer of expanded metal was rolled into a cylindrical shape and was then forced into the hollow shaft. The braze coated end of the silicon nitride rod was forced into the center of the expanded metal layer. The assembly was then brazed at 700° C. under vacuum to provide a good joint.

EXAMPLE 6

A 4"×4×¾" thick alumina plate was brazed to a 4"×4"×0.1" thick steel plate with a 4"×4" nickel expanded metal layer therebetween. A 4"×4"×4 mil thick Incusil ABA foil was placed on each side of the expanded metal layer. The assembly was brazed at 700° C. under 10$^{-5}$ torr vacuum using a 600 gram load on the assembly. An excellent braze resulted.

I claim:

1. The method of joining two materials having different thermal coefficients of expansion comprising the steps of: disposing an expanded metal layer between said two materials, the type of physical contact made by the expanded metal layer being point contacts; disposing a brazing layer between the expanded metal layer and each of the two materials to be joined; and heating the assembly consisting of said two materials, expanded metal layer and brazing layers to melt the brazing layers so that brazing fillets occur only at said point contacts, thereby brazing the assembly and joining said two materials.

2. The method of claim 1 wherein said two materials are flat plates.

3. The method of claim 1 wherein said two materials comprise a shaft and a rod inserted into the shaft.

4. The method of claim 1 wherein said two materials comprise ceramics and/or metals.

5. The method of claim 1 wherein a brazing layer is applied in paste form.

6. The method of claim 1 wherein a brazing layer is applied as a foil.

7. The method of claim 1 wherein the expanded metal layer is made of nickel.

8. The method of claim 7 including the step of pre-oxidizing the nickel in order to minimize excessive running of the braze.

9. A brazed assembly consisting of two materials having different coefficients of thermal expansion with an expanded metal layer therebetween, the type of physical contact made by the expanded metal layer with each of said two materials being point contact, there being brazing fillets only at said point contacts.

10. The brazed assembly of claim 9 wherein said two materials are ceramic and/or metal.

11. The brazed assembly of claim 9 wherein said expanded metal layer is made of nickel.

12. The brazed assembly of claim 9 wherein said expanded metal layer consists of pre-oxidized nickel.

* * * * *